Patented Feb. 25, 1941

2,232,871

UNITED STATES PATENT OFFICE 2,232,871

COLORING OF HYDROCARBONS

Karl Schmidt, Cologne-Muhlheim, and Ottmar Wahl, Leverkusen-I. G. Werk, Germany, assignors to General Aniline & Film Corporation, a corporation of Delaware No Drawing. Application July 28, 1937, Serial No. 156,140. In Germany August 6, 1936

5 Claims. (Cl. 44—9)

The present invention relates to new compositions of matter, more particularly it relates to compositions of matter comprising a preponderant amount of liquid or solid hydrocarbons, and, dissolved therein, a smaller amount of compounds, which are obtainable by condensing one molecular proportion of cyanuric halides with 1 to 3 molecular proportions of polynuclear aromatic compounds, such as hydrocarbons or heterocyclic compounds.

I have found that the condensation products of 1 molecular proportion of cyanuric halide with 1 to 3 molecular proportions of polynuclear aromatic compounds which are more or less strongly colored substances, easily dissolve in liquid and solid hydrocarbons and are, therefore, suitable for providing liquid and solid hydrocarbons with distinctive colorings. In the case of liquid hydrocarbons the new compositions of matter are not only distinguished by a characteristic coloring but, moreover, by a very intensive fluorescence.

I have further found that the coloration and fluorescence not only vary when using different condensation products for one and the same hydrocarbon, but that also different hydrocarbons exhibit, when the same condensation product is dissolved therein, a different coloration and fluorescence, so that by my invention it is possible to easily distinguish hydrocarbons from another which ordinarily can be distinguished only with difficulty. A further advantage of my invention is that only small amounts of the said condensation products are to be dissolved in the hydrocarbons in order to produce the characteristic coloration and fluorescence; amounts of less than 0.1% are sufficient.

It is understood that also the use of such condensation products falls within the scope of the present invention which contain condensed to the cyanuric ring radicals of different polynuclear hydrocarbons or heterocyclic compounds.

The coloring substances used according to this invention are obtainable by condensation of 1 molecular proportion of cyanuric halide, especially cyanuric chloride, with at least one up to three molecular proportions of a polynuclear aromatic compound, such as hydrocarbons or heterocyclic compounds, advantageously in the presence of aluminium chloride and, if desired, in a suitable solvent.

The following examples illustrate the invention without being restricted thereto, the parts being by weight.

Example 1

18.2 parts of cyanuric chloride and 20.2 parts of pyrene are dissolved in 200 parts of dry benzene and, while stirring for one hour at about 25° C., anhydrous aluminium chloride is introduced. Hydrochloric acid is evolved. After about 12 hours' condensation is complete. The separated condensation product is filtered with suction and digested with water until there is no trace of aluminium; then it is carefully dried.

The yellow condensation product exhibits in benzene an intense bluish-green, and in benzine a blue fluorescence and is suitable for providing such hydrocarbons with identification colorings.

Example 2

9.2 parts of cyanuric chloride and 8.9 parts of phenanthrene are dissolved in 100 parts of dry benzene, and during 2 hours at room temperature anhydrous aluminium chloride is introduced. The reaction mixture quickly assumes a deep reddish-brown coloration while hydrochloric acid escapes. After 12 hours the separated precipitate is filtered with suction and treated as described in Example 1.

The greyish-green condensation product dissolves in benzine hydrocarbons with an intense violet, in benzene with a bluish fluorescence.

Example 3

11.4 parts of chrysene and 9.2 parts of cyanuric chloride are dissolved in 100 parts of dry benzene and 60 parts of nitrobenzene, and during about 1½ hours there are introduced at room temperature 10 parts of anhydrous aluminium chloride. Then the reaction mixture is slowly heated to 85° C., which temperature is maintained for some hours. The solvent is distilled in vacuum and the residue is digested with cold water until no trace of aluminium can be detected, and dried.

The condensation product exhibits in benzine hydrocarbons a dull bluish-violet, in benzene a brownish-yellow fluorescence.

If N-ethylcarbazole is condensed with cyanuric chloride there is obtained a compound which dissolves in benzene with a yellowish-green fluorescence.

The condensation product from cyanuric chloride and perylene dissolves in benzene with a whitish-yellow, in paraffin oil with a bluish fluorescence.

Example 4

4.6 parts of cyanuric chloride and 8.9 parts of perylene are introduced into 150 parts of carbon disulfide, and, while stirring, 10 parts of anhydrous aluminium chloride are added at about 20° C. The whole mixture is stirred during 12 hours at 20-25° C. The condensation product is filtered with suction, digested with water until there is no longer any trace of aluminium detectable, and dried.

The benzene solution is orange colored. Only in a great dilution is the fluorescence yellowish-green.

Example 5

9.2 parts of cyanuric chloride and 25.2 parts of perylene are introduced into 100 parts of nitrobenzene, and, while stirring, there are added at room temperature 20 parts of anhydrous aluminium chloride. The mixture is slowly heated to 150° C., which temperature is maintained for 3 hours. After cooling the mixture is diluted with xylene so that the condensation product precipitates. The precipitate is filtered with suction, washed with ligroin and dried.

The condensation product dissolves in benzene with a reddish-brown coloration. Only in a great dilution does the solution display a yellowish-green fluorescence.

In a ligroin solution the fluorescence is bluish-green.

We claim:

1. A composition of matter comprising a preponderant amount of a liquid hydrocarbon and having dissolved therein a smaller amount of a coloring matter of the general formula

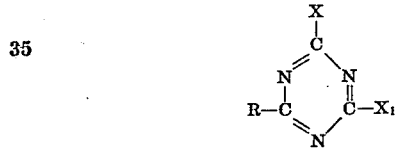

wherein R stands for a radical of a polynuclear aromatic compound selected from the group consisting of pyrene, phenanthrene, chrysene, perylene and N-ethylcarbazole and X and $X_1$ stand for one of the group consisting of halogen, and the pyrene, phenanthrene, chrysene, perylene and N-ethyl carbazole radicals.

2. A composition of matter comprising a preponderant amount of a liquid hydrocarbon and having dissolved therein, a smaller amount of a coloring matter of the formula

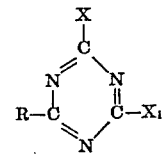

wherein R stands for the radical of perylene and X and $X_1$ stand for one of the group consisting of chlorine, and the pyrene, phenanthrene, chrysene, perylene and N-ethyl carbazole radicals.

3. A composition of matter comprising a preponderant amount of a liquid hydrocarbon and having dissolved therein a smaller amount of the compound of the formula

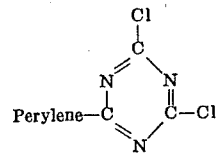

4. A composition of matter comprising a preponderant amount of a liquid hydrocarbon and having dissolved therein a smaller amount of the compound of the formula

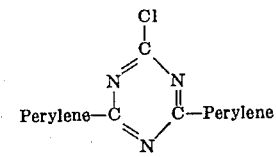

5. A composition of matter comprising a preponderant amount of a liquid hydrocarbon and having dissolved therein a smaller amount of the compound of the formula

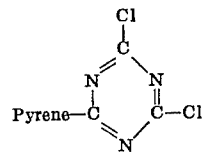

KARL SCHMIDT.
OTTMAR WAHL.